US008679260B2

(12) United States Patent
Hillman, Jr. et al.

(10) Patent No.: US 8,679,260 B2
(45) Date of Patent: Mar. 25, 2014

(54) METHODS AND SYSTEMS FOR MOVEMENT OF AN AUTOMATIC CLEANING DEVICE USING VIDEO SIGNAL

(75) Inventors: Henry L. Hillman, Jr., Vancouver, WA (US); David M. Knuth, Jr., East Dubuque, IL (US); Daniel M. Daly, Brownsburgh, IN (US); Vinton Coffman, Pittsburgh, PA (US); Ralph McCann, Richmond, VA (US); Stephen D. Herr, Richmond, VA (US); Kevin L. Thomas, Richmond, VA (US)

(73) Assignee: Intellibot Robotics LLC, Portland, OR (US)

( * ) Notice: Subject to any disclaimer, the term of this patent is extended or adjusted under 35 U.S.C. 154(b) by 977 days.

(21) Appl. No.: 12/616,577

(22) Filed: Nov. 11, 2009

(65) Prior Publication Data

US 2011/0108064 A1    May 12, 2011

(51) Int. Cl.
    *G05B 15/00*    (2006.01)
(52) U.S. Cl.
    USPC ............ 134/56 R; 134/113; 250/559.19; 250/559.33; 700/253; 700/259
(58) Field of Classification Search
    None
    See application file for complete search history.

(56) References Cited

U.S. PATENT DOCUMENTS

| | | | |
|---|---|---|---|
| 5,751,450 A * | 5/1998 | Robinson | 358/504 |
| 6,124,694 A | 9/2000 | Bancroft et al. | |
| 6,732,826 B2 | 5/2004 | Song et al. | |
| 7,320,149 B1 * | 1/2008 | Huffman et al. | 15/320 |
| 7,720,572 B2 | 5/2010 | Ziegler et al. | |
| 7,805,220 B2 | 9/2010 | Taylor et al. | |
| 2002/0153184 A1 | 10/2002 | Song et al. | |
| 2002/0156556 A1 | 10/2002 | Ruffner | |
| 2005/0000543 A1 * | 1/2005 | Taylor et al. | 134/18 |
| 2008/0027591 A1 | 1/2008 | Lenser et al. | |
| 2008/0154457 A1 | 6/2008 | Yu et al. | |
| 2009/0024251 A1 | 1/2009 | Myeong et al. | |
| 2009/0055020 A1 | 2/2009 | Jeong et al. | |
| 2009/0118865 A1 | 5/2009 | Egawa et al. | |
| 2010/0299016 A1 | 11/2010 | Benzler et al. | |

FOREIGN PATENT DOCUMENTS

WO    WO-9422094 A1    9/1994

OTHER PUBLICATIONS

Rowe et al., "CMUcam3: An Open Programmable Embedded Vision Sensor", May 2007, Robotics Institute, Carnegie Mellon University, Pittsburgh, PA.
http://www.cmucam.org/wiki/software, printed from internet Nov. 11, 2009.

* cited by examiner

*Primary Examiner* — Michael Kornakov
*Assistant Examiner* — Ryan Coleman
(74) *Attorney, Agent, or Firm* — Fox Rothschild LLP (57) ABSTRACT

A method of cleaning an area using an automatic cleaning device may include receiving, from a video camera, information associated with an edge located on a surface, determining, by an automatic cleaning device, a position of the automatic cleaning device on the surface relative to the edge and using the received information to move the automatic cleaning device from the determined position along a path so that the automatic cleaning device cleans the surface along the path. The path may be substantially parallel to the edge, and the edge may be located a distance from a reference point on the automatic cleaning device during movement of the automatic cleaning device.

5 Claims, 6 Drawing Sheets

METHODS AND SYSTEMS FOR MOVEMENT OF AN AUTOMATIC CLEANING DEVICE USING VIDEO SIGNAL

CROSS REFERENCE TO RELATED APPLICATIONS

This application is related to U.S. patent application Ser. No. 12/616,452 filed Nov. 11, 2009.

BACKGROUND

Mobile robotic devices have minimized the human effort involved in performing everyday tasks. For example, automatic cleaning devices help maintaining and cleaning surfaces, such as hardwood floors, carpet and the like. Mobile robotic devices are useful, but location detection can be a challenge for the operation of such devices.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a method of cleaning an area using an automatic cleaning device may include receiving, from a video camera, information associated with an edge located on a surface, determining, by an automatic cleaning device, a position of the automatic cleaning device on the surface relative to the edge and using the received information to move the automatic cleaning device from the determined position along a path so that the automatic cleaning device cleans the surface along the path. The path may be substantially parallel to the edge, and the edge may be located a distance from a reference point on the automatic cleaning device during movement of the automatic cleaning device.

In an embodiment, a method of cleaning an environment using an automatic cleaning device may include sending, to a video camera, a request for information comprising a color value and a tolerance value, receiving, from the video camera, information associated with an area corresponding to the color value and the tolerance value and using the received information to adjust a position of the automatic cleaning device on a surface of an environment.

In an embodiment, a method of cleaning an area using an automatic cleaning device may include receiving, from a video camera, information associated with an edge located on a surface, determining, by an automatic cleaning device, a position of the automatic cleaning device on the surface relative to the edge; and adjusting the position of the automatic cleaning device based on a proximity of the automatic cleaning device to the edge.

A system for cleaning an area using an automatic cleaning device may include an automatic cleaning device having a processing device and a computer-readable storage medium; and a video camera in communication with the automatic cleaning device. The computer-readable storage medium may include one or more programming instructions for receiving, from the video camera, information associated with an edge located on a surface of an area, determining a position of the automatic cleaning device on the surface relative to the edge, and using the received information to move the automatic cleaning device from the determined position along a path. The path may be substantially parallel to the edge, and the edge may be located a distance from a reference point on the automatic cleaning device during movement of the automatic cleaning device.

In an embodiment, a system for cleaning an environment using an automatic cleaning device may include an automatic cleaning device having a processing device and a computer-readable storage medium, and a video camera in communication with the automatic cleaning device. The computer-readable storage medium may include one or more programming instructions for sending, to the video camera, a request for information comprising a color value and a tolerance value, receiving, from the video camera, information associated with an area corresponding to the color value and the tolerance value, and using the received information to adjust a position of the automatic cleaning device on a surface of the environment.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
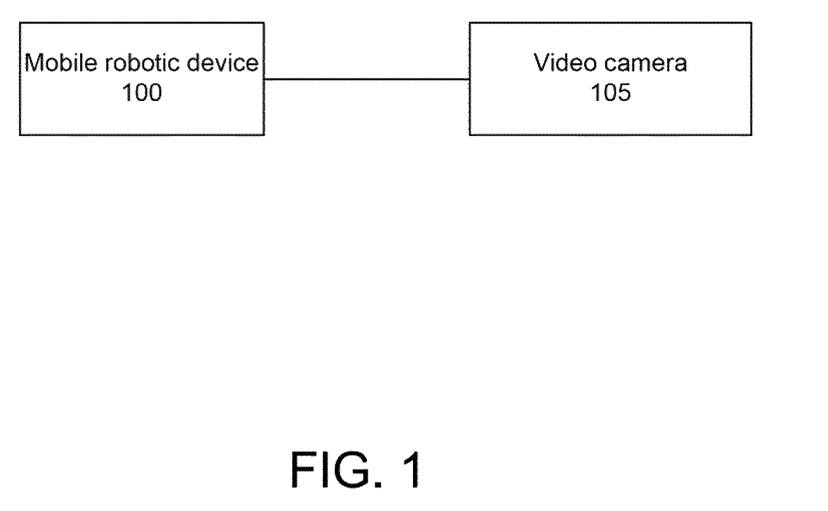
FIG. 1 illustrates an exemplary robotic system according to an embodiment.

FIG. 1 illustrates an exemplary robotic system according to an embodiment. As illustrated by FIG. 1, a robotic system may include a mobile robotic device 100 and a video camera 105. In an embodiment, the mobile robotic device 100 may be an autonomous device that is capable of automatically navigating its environment. A mobile robotic device 100 may include a processing device, a computer-readable storage medium and/or the like. In an embodiment, a mobile robotic device 100 may be in communication with one or more external processing devices, computer-readable storage mediums and/or the like.

In an embodiment, the video camera 105 may be a color video camera, a black and white video camera and/or the like. In an embodiment, the video camera 105 may be mounted on a front portion of a mobile robotic device 100. In an alternate embodiment, the video camera 105 may be mounted on a rear portion, a side portion or other portion of the mobile robotic device 100. The video camera 105 may include a processing device, a computer-readable storage medium and/or the like. In an embodiment, the video camera 105 may be in communication with the mobile robotic device 100 and/or one or more external processing devices, computer-readable storage mediums and/or the like. For example, the video camera 105 may collect information about the mobile robotic device's surroundings such as coordinates, navigational information, visual information and/or the like. The video camera 105 may provide this information to the mobile robotic device 100.

In an embodiment, the video camera 105 may be a CMUcam3. The CMUcam3 is an ARM7TDMI-based programmable embedded computer vision sensor developed by Carnegie Mellon University. Additional and/or alternate video cameras may be used within the scope of this disclosure.

Figure 2:
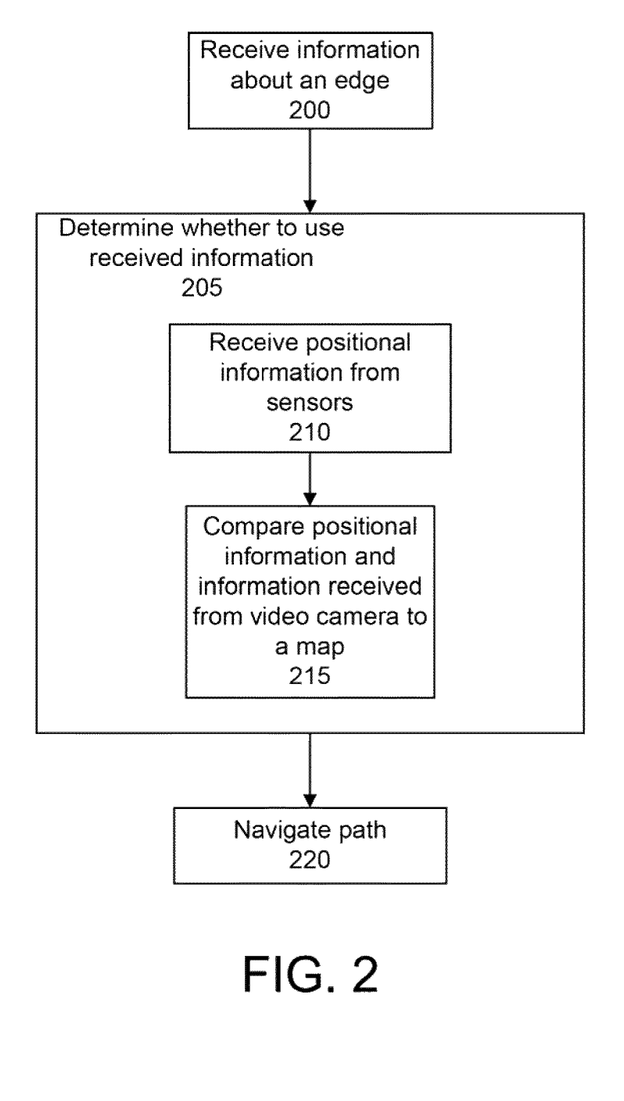
FIG. 2 illustrates an exemplary method of navigating a mobile robotic device according to an embodiment.

FIG. 2 illustrates an exemplary method of navigating a mobile robotic device according to an embodiment. As illustrated by FIG. 2, a mobile robotic device may receive 200 information regarding its surrounding environment from a video camera. For example, in an embodiment, a video camera may perform image processing on a video frame to locate one or more substantially straight lines in the image. In an embodiment, a substantially straight line may be representative of a boundary or edge between rooms, floor types and/or the like. For example, a video camera may be able to detect an edge between two adjoining rooms. Similarly, a video camera may be able to detect an edge between a carpeted floor and a tile floor. In an embodiment, an edge may be detected based on color contrast and/or the like.

In an embodiment, the mobile robotic device may receive 200 information regarding an edge from the video camera. The information may include values associated with the slope, the intercept and/or the error of a line detected by the video camera. For example, the slope, intercept and/or error associated with a substantially straight lines from an image of a surface, such as a ground surface, a floor surface or other surface over which the mobile robotic device is travelling may be provided to the mobile robotic device. In an embodiment, the video camera may repetitively send updated information to the mobile robotic device. For example, the video camera may send the mobile robotic device updated slope values, intercept values and/or error values associated with a detected line several times per second.

In an embodiment, a mobile robotic device may use this information to determine its position relative to the detected edge. For example, a mobile robotic device may compare information about its current position, such as its coordinates, heading and/or the like, with information received from the video camera regarding the edge. The mobile robotic device may use this comparison to determine its position relative to the edge, its distance away from the edge and/or the like.

In an embodiment, a mobile robotic device may detect an edge located in the direction of the mobile robotic device's movement. For example, a mobile robotic device may detect an edge in front of the mobile robotic device when the mobile robotic device is moving forward. A mobile robotic device may detect an edge that is substantially perpendicular to its movement. For example, a mobile robotic device may detect an edge associated with a wall or other barrier that the mobile robotic device is approaching. In an embodiment, a mobile robotic device may adjust its motion based on its proximity to a detected edge. For example, a mobile robotic device may turn itself around or otherwise change its course when it comes within two feet of the detected edge. Additional and/or alternate proximities may be used within the scope of this disclosure.

In an embodiment, the mobile robotic device may determine 205 whether to use any of the information received from the video camera to adjust its position. For example, the mobile robotic device may receive 210 positional information from one or more sensors, such as sonar, radar and/or the like. The mobile robotic device may compare 215 the information that it receives from its sensors and the information that it receives from the video camera to information from a map of an area or environment in which the mobile robotic device is navigating.

In an embodiment, a map may be generated by the mobile robotic device and/or another computing device during the mobile robotic device's first navigation of the area. For example, the mobile robotic device may be manually controlled through an area during which time the mobile robotic device may generate and store a map of the navigated area. In an embodiment, the mobile robotic device may compare 215 the information it receives 210 from its sensors and the information it receives from the video camera to the digital representation of the map to determine which information to use. In an embodiment, the mobile robotic device may use the information that has the least amount of error as compared to the mobile robotic device's current position. For example, a mobile robotic device may determine a current position using a map. It may compare the information received from its sensor and the information it receives from its video camera to determine which information has the least amount of error relative to its current position. The mobile robotic device may adjust its position based on the information associated with the least amount of error.

In an embodiment, the mobile robotic device may use the information associated with an edge and its determined position to navigate 220 a path. In an embodiment, the mobile robotic device may navigate 220 a path relative to the edge. For example, the mobile robotic device may navigate 220 a path that begins at the determined position and that runs parallel to the edge. Alternatively, the mobile robotic device may navigate 220 a path that begins at the determined position and that is not parallel to the edge.

In an embodiment, the mobile robotic device may navigate 220 a path such that the edge is located a certain distance from a reference point on the mobile robotic device. The reference point may be a side portion, a front portion, a back portion and/or the like of the mobile robotic device. For example, a mobile robotic device may use a detected line as a side registration by tracking the line on the right or left side of the mobile robotic device.

Figure 3:
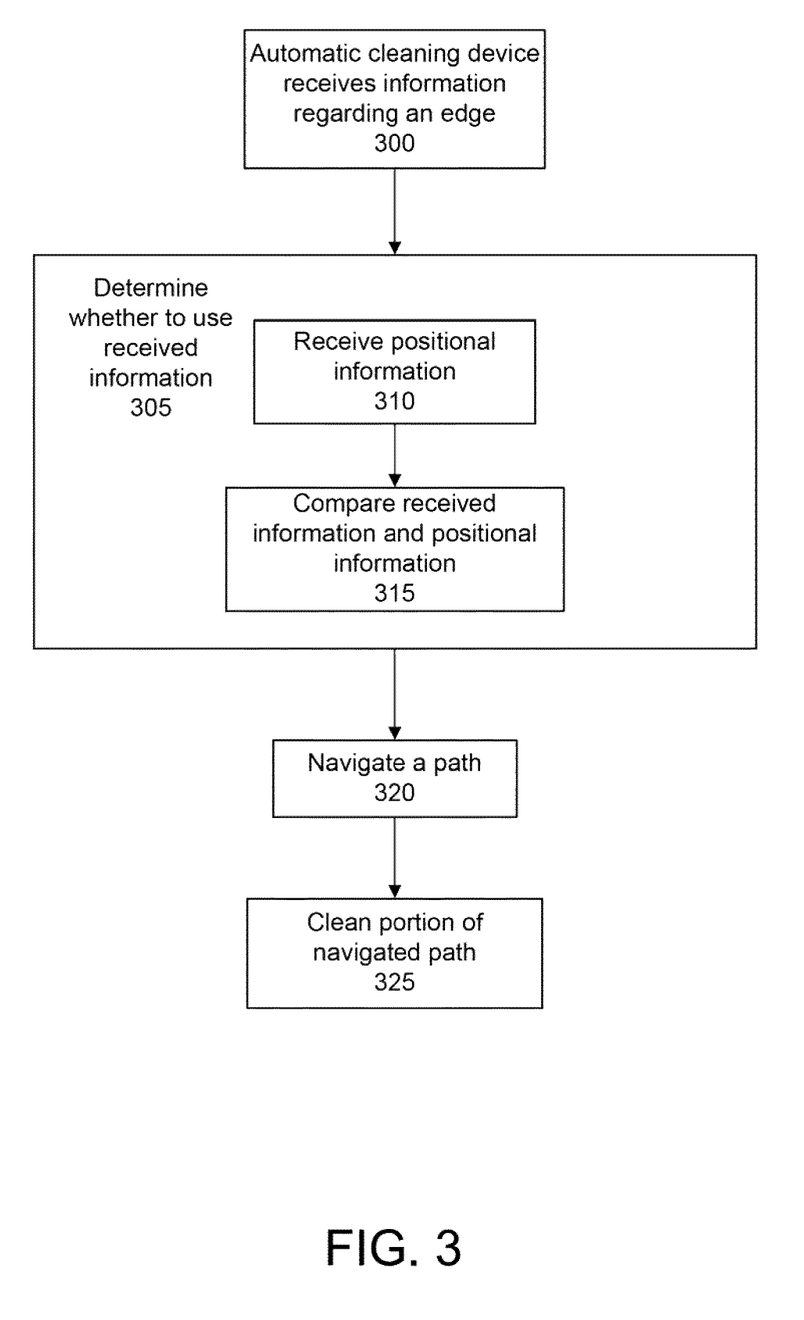
FIG. 3 illustrates an exemplary method of cleaning an area with an automatic cleaning device according to an embodiment.

In an embodiment, a mobile robotic device may include an automatic cleaning device. An automatic cleaning device may be a mobile robotic device that can automatically navigate and clean surfaces, such as floors. FIG. 3 illustrates an exemplary method of cleaning an area with an automatic cleaning device according to an embodiment.

As described above with respect to a mobile robotic device, an automatic cleaning device may receive 300 information regarding an edge from the video camera. The information may include values associated with the slope, the intercept and/or the error of a line detected by the video camera.

In an embodiment, an automatic cleaning device may use this received information to determine its position relative to the detected edge. For example, an automatic cleaning device may compare information about its current position, such as its coordinates, heading and/or the like, with information received from the video camera regarding the edge.

In an embodiment, the automatic cleaning device may determine 305 whether to use any of the information received from the video camera to adjust its position. For example, the automatic cleaning device may receive 310 positional information from one or more sensors, such as sonar, radar and/or the like. The automatic device may compare 315 the information that it receives from its sensors and the information that it receives from the video camera to information from a map of an area in which the automatic cleaning device is navigating.

In an embodiment, the automatic cleaning device may compare 315 the information it receives 310 from its sensors and the information it receives from the video camera to the digital representation of the map to determine which information to use. In an embodiment, the automatic cleaning device may use the information that has the least amount of error as compared to the automatic cleaning device's current position. For example, an automatic cleaning device may determine a current position using a map. It may compare the information received from its sensor and the information it receives from its video camera to determine which information has the least amount of error relative to its current position. The automatic cleaning device may adjust its position based on the information associated with the least amount of error.

In an embodiment, the automatic cleaning device may use the information associated with an edge and its determined position to navigate 320 a path. The automatic cleaning device may navigate 320 a path relative to the edge. For example, the automatic cleaning device may navigate 320 a path that begins at the determined position and that runs parallel to the edge. In an embodiment, the automatic cleaning device may navigate 320 the path such that the edge is located a certain distance from a reference point on the automatic cleaning device. The reference point may be a side portion, a front portion, a back portion and/or the like of the automatic cleaning device. For example, an automatic cleaning device may use a detected line as a side registration by tracking the line on the right or left side of the automatic cleaning device.

In an embodiment, the automatic cleaning device may clean 325 at least a portion of its navigated path. For example, an automatic cleaning device may be able to determine one or more characteristics corresponding to its determined position. A characteristic may include, for example, a floor type, such as hard wood, tile, carpet and/or the like. A characteristic may include whether the position is in a high-traffic area, a low-traffic area and/or the like. In an embodiment, an automatic cleaning device may determine an appropriate cleaning method based on the determined characteristics. For example, the automatic cleaning device may vacuum a carpeted area, scrub and/or wax a hardwood or tile area and/or the like.

Figure 4:
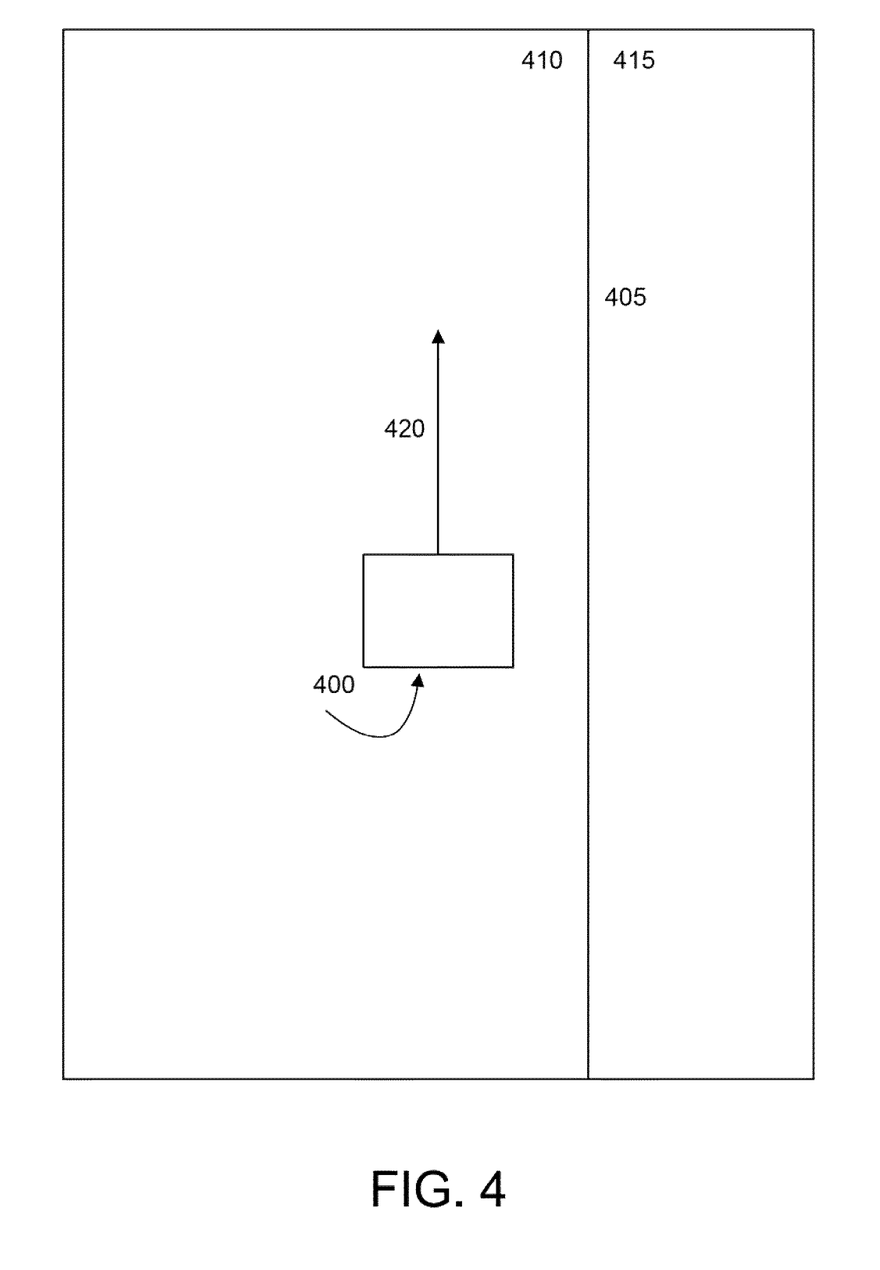
FIG. 4 illustrates an exemplary diagram of a mobile robotic device's movement according to an embodiment.

FIG. 4 illustrates an exemplary diagram of a mobile robotic device's movement according to an embodiment. As illustrated by FIG. 4, a mobile robotic device 400 may track an edge 405 between a carpeted portion of a floor 410 and a tiled portion of a floor 415. In an embodiment, the mobile robotic device 400 may move relative to the edge 405. For example, as illustrated in FIG. 3, the mobile robotic device 400 may move along the illustrated path 420, which may run parallel to the edge 405.

In an embodiment, a mobile robotic device may navigate its surroundings based on its location relative to an area of a particular color. An area may be a surface area, an item, a landmark and/or the like. For example, a mobile robotic device may navigate an area based on its relative position to a green chair located in a room.

Figure 5:
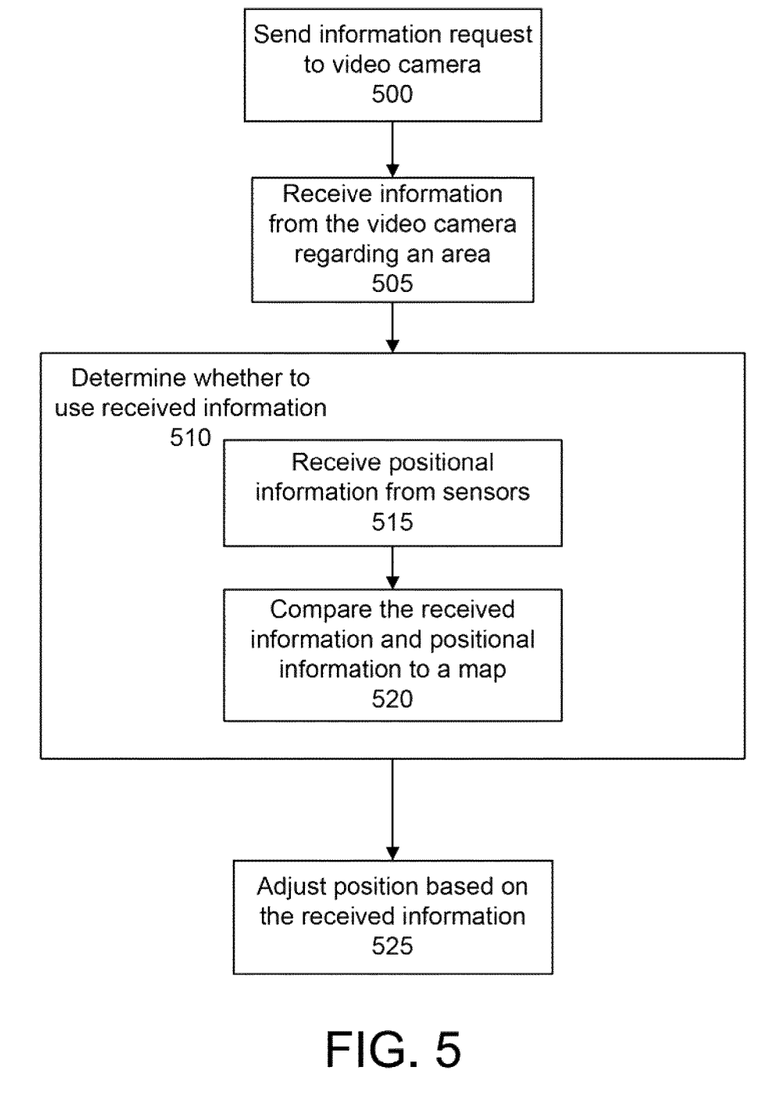
FIG. 5 illustrates an exemplary method of navigating a mobile robotic device according to an embodiment.

FIG. 5 illustrates an exemplary method of navigating a mobile robotic device according to an embodiment. As illustrated by FIG. 5, a mobile robotic device may send 500 an information request to the video camera. The information request may include an indication of a color and a tolerance associated with the color. In an embodiment, an indication of a color may be a color name, a number associated with a color and/or the like. For example, a mobile robotic device may send 500 an instruction to the video camera asking it to search for the color green. The instruction may also include a tolerance value which may instruct the video camera as to a range of colors that may be accepted.

In an embodiment, the mobile robotic device may receive 505 information from the video camera. For example, the mobile robotic device may receive 505 from the video camera coordinates associated with a substantially central portion of an area corresponding to the specified color. The mobile robotic device may also receive 505 coordinates of one or more corners of a rectangle that encompasses the detected area. For example, the video camera may send the mobile robotic device coordinates of the corners of a bounding box that is just large enough to completely encompass the detected area. In an embodiment, the mobile robotic device may receive a number of pixels of the color that were detected in the area.

In an embodiment, the mobile robotic device may receive 505 from the video camera a numerical value associated with a detected color and/or an associated tolerance range. For example, each color that is detected by the video camera may be assigned a numerical value. The numerical value associated with a detected color may be compared to a numerical value associated with the requested color. If the numerical value associated with the detected color is within a tolerance range (i.e., the numerical value associated with the requested color+/−the tolerance value), the detected color may be accepted. The mobile robotic device may receive from the video camera the value of the detected color and/or the tolerance range.

In an embodiment, the mobile robotic device may determine 510 whether to use any of the information received from the video camera in navigating its path. For example, the mobile robotic device may receive 515 positional information from one or more sensors, such as sonar, radar and/or the like. In an embodiment, the mobile robotic device may compare 520 the information that it receives from its sensors and the information that it receives from the video camera to information from a map of an area in which the mobile robotic device is navigating.

In an embodiment, a map may be generated by the mobile robotic device and/or another computing device during the mobile robotic device's first navigation of the area. For example, the mobile robotic device may be manually controlled through an area during which time the mobile robotic device may generate and store a map of the navigated area. In an alternate embodiment, a map of an area may be generated manually. For example, a may be generated by a user and a digital representation of the map may be stored electronically.

In an embodiment, the mobile robotic device may compare 520 the information it receives 515 from its sensors and the information it receives from the video camera to the digital representation of the map to determine which information to use. In an embodiment, the mobile robotic device may use the information that has the least amount of error as compared to the mobile robotic device's current position. For example, a mobile robotic device may determine a current position using a map. It may compare the information received from its sensor and the information it receives from its video camera to determine which information has the least amount of error relative to its current position. The mobile robotic device may adjust its position based on the information associated with the least amount of error.

In an embodiment, the mobile robotic device may adjust 525 its position based on the most accurate information. The mobile robotic device may use the information to adjust 525 its position, heading and/or the like. For example, an estimated position of the mobile robotic device may be determined. The estimated position may include coordinates, a heading and/or the like. In an embodiment, an actual position may be determined based on the information associated with the detected area that is received by the mobile robotic device. The estimated position may be compared to the actual position, and the mobile robotic device may adjust 525 its position to compensate for any positional error that may exist. For example, the mobile robotic device may navigate from its actual position to the estimated position.

Figure 6:
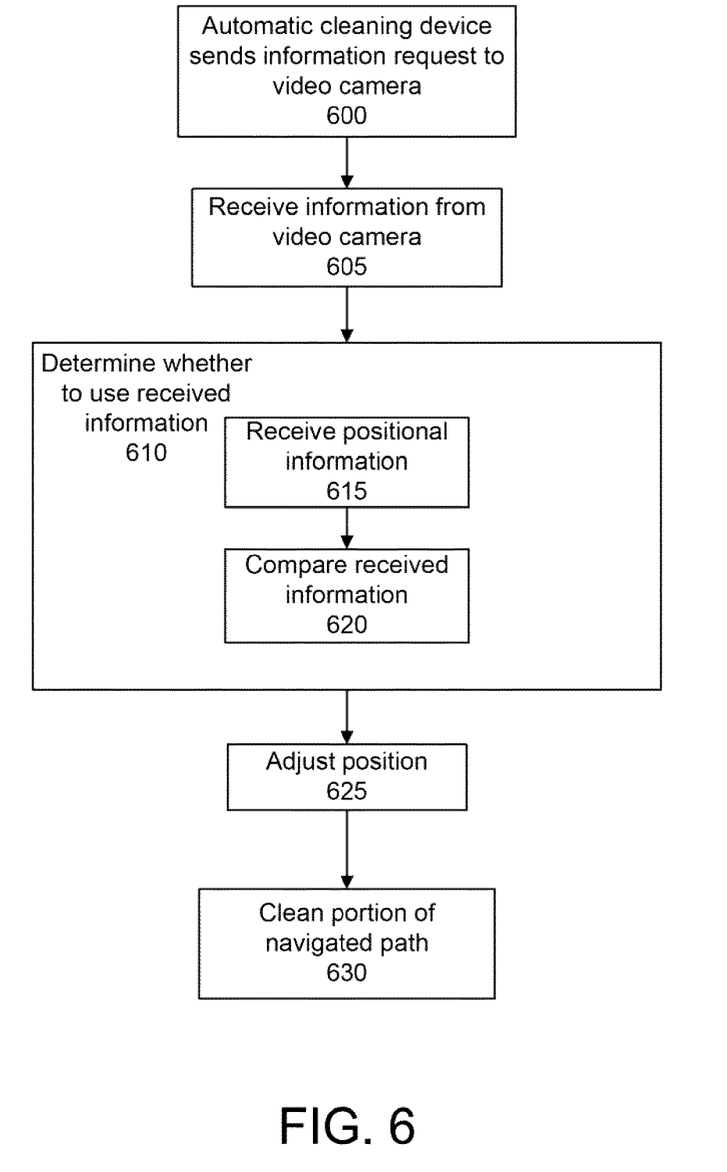
FIG. 6 illustrates an exemplary method of navigating an automatic cleaning device according to an embodiment.

FIG. 6 illustrates an exemplary method of navigating an automatic cleaning device according to an embodiment. As illustrated by FIG. 6, an automatic cleaning device may send 600 an information request to the video camera. The information request may include an indication of a color and a tolerance associated with the color. The instruction may also include a tolerance value which may instruct the video camera as to a range of colors that may be accepted.

In an embodiment, the automatic cleaning device may receive 605 information from the video camera. For example, the automatic cleaning device may receive 605 from the video camera coordinates associated with a substantially central portion of an area corresponding to the specified color. The automatic cleaning device may also receive 605 coordinates of one or more corners of a rectangle that encompasses the detected area. In an embodiment, the automatic cleaning device may receive a number of pixels of the color that were detected in the area.

In an embodiment, the automatic cleaning device may receive 605 from the video camera a numerical value associated with a detected color and/or an associated tolerance range. For example, each color that is detected by the video camera may be assigned a numerical value. The numerical value associated with a detected color may be compared to a numerical value associated with the requested color. If the numerical value associated with the detected color is within a tolerance range (i.e., the numerical value associated with the requested color+/−the tolerance value), the detected color may be accepted. The automatic cleaning device may receive from the video camera the value of the detected color and/or the tolerance range.

In an embodiment, the automatic cleaning device may determine 610 whether to use any of the information received from the video camera in navigating its path. For example, the automatic cleaning device may receive 615 positional information from one or more sensors, such as sonar, radar and/or the like. In an embodiment, the automatic cleaning device may compare 620 the information that it receives from its sensors and the information that it receives from the video camera to information from a map of an area in which the automatic cleaning device is navigating.

In an embodiment, a map may be generated by the automatic cleaning device and/or another computing device during the automatic cleaning device's first navigation of the area. For example, the automatic cleaning device may be manually controlled through an area during which time the mobile robotic device may generate and store a map of the navigated area. In an embodiment, the mobile robotic device may compare 620 the information it receives 615 from its sensors and the information it receives from the video camera to the digital representation of the map to determine which information to use.

In an embodiment, the automatic cleaning device may use the information that has the least amount of error as compared to the automatic cleaning device's current position. For example, an automatic cleaning device may determine a current position using a map. It may compare the information received from its sensor and the information it receives from its video camera to determine which information has the least amount of error relative to its current position. The automatic cleaning device may adjust its position based on the information associated with the least amount of error.

In an embodiment, the automatic cleaning device may adjust 625 its position based on the most accurate information. The automatic cleaning device may use the information to adjust 625 its position, heading and/or the like. For example, an estimated position of the automatic cleaning device may be determined. The estimated position may include coordinates, a heading and/or the like. In an embodiment, an actual position may be determined based on the information associated with the detected area that is received by the automatic cleaning device. The estimated position may be compared to the actual position, and the automatic cleaning device may adjust 625 its position to compensate for any positional error that may exist. For example, the automatic cleaning device may navigate from its actual position to the estimated position.

In an embodiment, the automatic cleaning device may clean 630 at least a portion of its navigated path. For example, an automatic cleaning device may be able to determine one or more characteristics corresponding to its determined position. A characteristic may include, for example, a floor type, such as hardwood, tile, carpet and/or the like. A characteristic may include whether the position is in a high-traffic area, a low-traffic area and/or the like. In an embodiment, an automatic cleaning device may determine an appropriate cleaning method based on the determined characteristics. For example, the automatic cleaning device may vacuum a carpeted area, scrub and/or wax a hardwood or tile area and/or the like.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for cleaning an environment using an automated cleaning device, the system comprising:
   an automatic cleaning device comprising a processing device and a computer-readable storage medium; and
   a video camera in communication with the automatic cleaning device;
   wherein the computer-readable storage medium comprises programming instructions for:
      generating, by the processing device, a digital representation of a map of an area navigated by the automatic cleaning device,
      sending, to the video camera, one or more instructions to search for a color in an area having a color value that is within a tolerance range,
      receiving, from the video camera, information associated with at least a portion of the area that corresponds to the color value,
      receiving, by the processing device, position data for the automatic cleaning device from one or more sensors associated with the automatic cleaning device,
      comparing, by the processing device, each of the received information and the received position data to the digital representation of the map to determine which of the received information and the received position data has a least amount of error relative to a current position of the automatic cleaning device, using the received information to adjust a current position of the automatic cleaning device if the received information has the least amount of error, and cleaning at least a portion of a path along which the automatic cleaning device is navigated.

2. The system of claim 1, wherein the programming instructions for receiving information comprise one or more programming instructions for receiving one or more of the following:

coordinates associated with a substantially center portion of the area;

coordinates associated with one or more corners of a rectangle that surrounds the area;

a number of pixels of the color within the area; and a numerical value associated with a detected color.

3. The system of claim 1, wherein the programming instructions for using the received information comprise one or more programming instructions for:

adjusting the path based on the received information in response to an amount of error associated with the received information as compared to the current position being less than an amount of error associated with the received position data as compared to the current position.

4. The system of claim 1, wherein the programming instructions for using the received information to adjust a current position of the automatic cleaning device comprise one or more programming instructions for:

determining an estimated location of the automatic cleaning device;

using the received information to determine an actual location of the automatic cleaning device; and if the estimated location differs from the actual location, moving to the estimated location.

5. The system of claim 1, wherein the programming instructions for cleaning at least a portion of the path comprise one or more programming instructions for:

determining one or more characteristics associated with the portion of the surface;

determining a cleaning method based on the determined one or more characteristics; and applying the cleaning method to the portion of the surface.

* * * * *